Dec. 16, 1924.

D. E. BERNIER 1,519,236

PULLEY FASTENING DEVICE

Filed Dec. 5, 1923

Inventor

Daniel E. Bernier

By Watson E. Coleman

Attorney

Patented Dec. 16, 1924.

1,519,236

UNITED STATES PATENT OFFICE.

DANIEL E. BERNIER, OF PIERCEFIELD, NEW YORK.

PULLEY-FASTENING DEVICE.

Application filed December 5, 1923. Serial No. 678,687.

*To all whom it may concern:*

Be it known that I, DANIEL E. BERNIER, a citizen of the United States, residing at Piercefield, in the county of Saint Lawrence and State of New York, have invented certain new and useful Improvements in Pulley-Fastening Devices, of which the following is a specification, reference being had to the accompanying drawings.

This invention relates to machine elements, particularly to pulleys and shafting, and has for its object the provision of novel means for effecting rigid securing of a pulley or equivalent element upon its supporting shaft with which it is to rotate, the means employed being of particular advantage inasmuch as installation may be effected in a very simple manner and without the employment of any special tools.

An important object is the provision of a securing means which eliminates use of the well known key which has proved defective in many cases on account of loosening in service and consequent eventual shearing off.

An additional object is the provision of an arrangement of this character which will be simple and inexpensive in manufacture, positive in action, efficient and durable in service, and a general improvement in the art.

With the above and other objects and advantages in view, the invention consists in the combination and arrangement of parts to be hereinafter more fully described and claimed and illustrated in the accompanying drawings in which:

Figure 2:
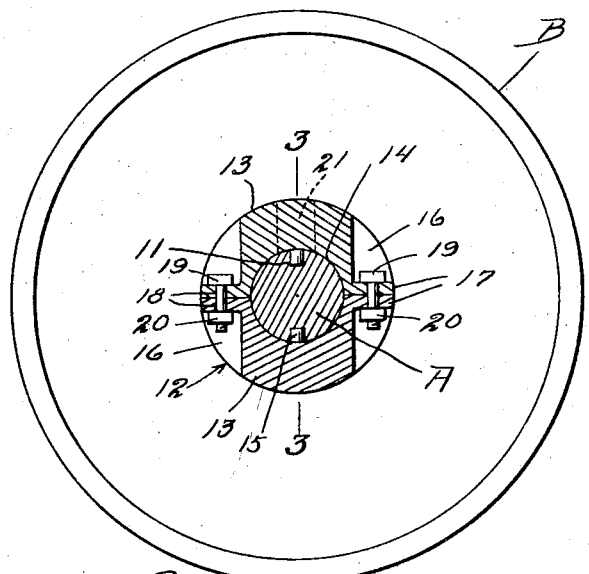
Figure 2 is a section on the line 2—2 of Figure 1.
Figure 3:
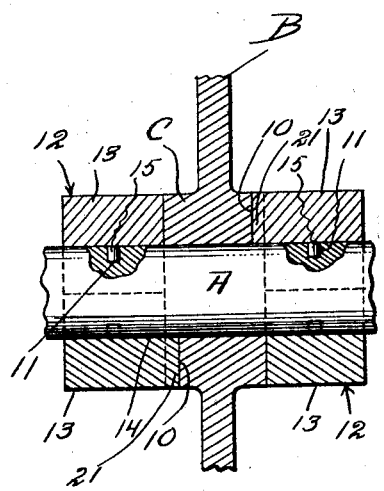
Figure 3 is a detail section on the line 3—3 of Figure 2.
Figure 1:
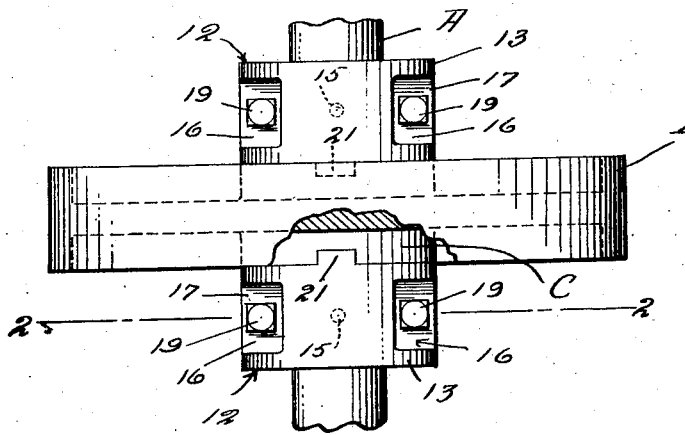
Figure 1 is a plan view, with parts broken away and in section, showing my pulley fastening means.
Figure 4:
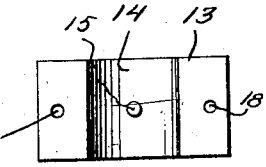
Figure 4 is a detail inside face view of one of clamping members.

Referring more particularly to the drawings, the letter A represents a shaft upon which it is desired to secure a pulley B having a hub portion C. While a pulley is referred to throughout the description and while it is shown in the drawings, it should be distinctly understood in advance that the securing means is equally well adapted for mounting a gear, cam or any other element to be rigidly secured upon a rotating shaft.

In carrying out the invention, it is necessary that the hub C of the pulley or other element be provided at opposite sides with radial grooves 10, two being shown in the present instance extending preferably, though not necessarily, in opposite directions from the center. It is also requisite that the shaft be provided with sockets 11 at diametrically opposite points and at spaced distances from the faces of the hub C.

Disposed at opposite sides of the pulley or other element are clamping collars designated broadly by the numeral 12, and each clamping collar consists of a pair of similar mating sections 13 shown as semi-cylindrical in shape and with concaved bearing surfaces 14 conformingly engaging upon the shaft A. At the inner peripheries of these sections are pins 15 which fit snugly within the sockets 11 and which may be formed integrally upon the collar sections by casting or which may be constructed as separated pieces welded or otherwise fastened thereto, this detail being immaterial. Near their end portions the collar sections are cut away or recessed, as indicated at 16, to define flanges 17 formed with registering holes 18 for the passage of bolts 19 equipped with nuts 20.

The faces of the collar sections toward the hub C are formed with ribs or projections 21 which fit conformingly within the grooves 10.

In assembling the parts, the collar sections having the projections 21 thereon are engaged upon the shaft with their pins 15 fitting within the proper sockets 11 and are arranged so that these projections fit within the grooves 10 in the hub C. The other collar sections are then engaged upon the shaft and the bolts 19 inserted through the registering holes 18 and the nuts 20 drawn up.

From the foregoing description and a study of the drawings it will be apparent that I have thus provided a simply constructed and very inexpensive securing means for the purpose specified which may be installed without the employment of any special tool and so constructed and arranged as to eliminate use of keys or other equivalent elements commonly used. The parts are very few and as they are rigidly secured together it is apparent that there will be no play to cause wear and eventual breakdown of any of the mechanism.

While I have shown and described the preferred embodiment of my invention, it is of course to be understood that I reserve the right to make such changes in the form, construction and arrangement of parts as will not depart from the spirit of the invention or the scope of the subjoined claim.

I claim:

Means for securing an element upon a shaft, the element having a hub formed in its opposite faces with radial grooves comprising collars mounted on the shaft at opposite sides of the element, the collars being cylindrical in shape and extending as continuations of the hub of the element, the faces of the collars toward the hub being formed with radial projections fitting conformingly within said grooves, pins projecting inwardly from the collars, the shaft having recesses receiving the pins, each collar having its sections cut away to define flanges, and securing bolts passing through the flanges for holding the sections of the collars together.

In testimony whereof I hereunto affix my signature.

DANIEL E. BERNIER.